Dec. 9, 1924.
C. LUCAS
1,518,588
VEHICLE SIGNAL
Filed April 1, 1924
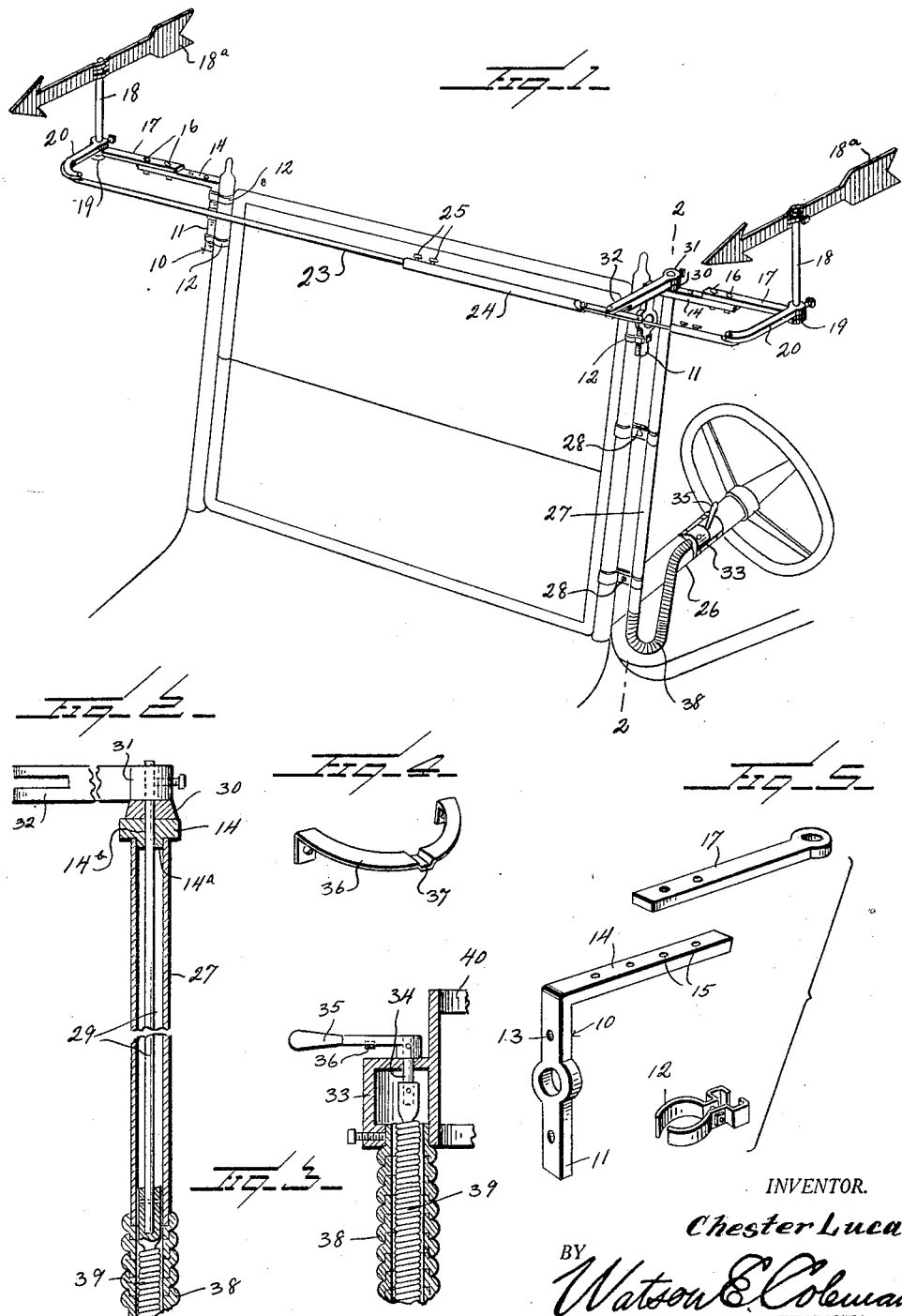
INVENTOR.
Chester Lucas
BY Watson E. Coleman
ATTORNEY.

Patented Dec. 9, 1924.

1,518,588

UNITED STATES PATENT OFFICE.

CHESTER LUCAS, OF CLARKDALE, ARIZONA.

VEHICLE SIGNAL.

Application filed April 1, 1924. Serial No. 703,433.

*To all whom it may concern:*

Be it known that I, CHESTER LUCAS, a citizen of the United States, residing at Clarkdale, in the county of Yavapai and State of Arizona, have invented certain new and useful Improvements in Vehicle Signals, of which the following is a specification, reference being had to the accompanying drawings.

This invention relates to vehicle signals and more particularly to a manually controlled vehicle signal.

An important object of the invention is to provide a device of this character having shiftable signaling elements at opposite sides of the vehicle and a common operating means for these signaling elements in which the operating means is so arranged, and particularly that portion connecting the signals, that it does not in any way obstruct the vision of the operator.

A further object of the invention is to provide a device of this character which is adjustable in its attachment to any desired type of car regardless of the width of the framework thereof and to furthermore provide a device which may be with equal facility applied to closed or open cars.

These and other objects I attain by the construction shown in the accompanying drawings, wherein for the purpose of illustration is shown a preferred embodiment of my invention and wherein:—

Figure 1 is a perspective view showing a signaling apparatus constructed in accord with my invention applied to the windshield of an automobile;

Figure 2 is a vertical sectional view on the line 2—2 of Figure 1;

Figure 3 is a section through the operating mechanism;

Figure 4 is a perspective of the spring for holding the operating handle in adjusted positions;

Figure 5 is a collective perspective of the mounting elements employed in mounting the signal.

Referring now more particularly to the drawings, the numeral 10 indicates an angular bracket one arm 11 of which is adapted for abutment against the outer surface of the vehicle to be attached thereto. The means of attachment where the vehicle is an open car consists of clamps 12 engaging the windshield frame and the arm 11. Where the car to be fitted is a closed car securing elements are directed through openings 13 formed in this arm for engagement with the framework of the car. The attachment of the bracket is made immediately at the front of the car and the remaining arm 14 thereof extends horizontally outwardly from the sides of the car. This arm is provided with a plurality of spaced openings 15 adapted for interchangeably receiving securing elements 16 extending through an extension arm 17, the outer end of which is provided with a vertically disposed pivot opening in which is rotatably engaged the end of a shaft 18, the shaft beneath the extension arm 17 being provided with a collar 19 to prevent upward displacemnt thereof. The upper end of this shaft has secured thereto an indicator 20 which may take any desired form but which is preferably in the form of a brightly colored arrow indicating a proposed direction of movement of the vehicle to which it is attached. To the shaft 18 immediately above the extension arm 17 an arm is secured, indicated at 18$^a$, this arm having a hub portion surrounding the shaft provided with a set screw 21 so that it may be affixed to the shaft. The end of this arm is preferably hooked toward the vehicle, the arm extending forwardly from the shaft and then inwardly as indicated at 22. There are two of the mechanisms just described, one disposed at each side of the vehicle, and one of the arms 22 has secured thereto a fine steel rod 23 and the other thereof has operatively secured thereto a tube 24, the internal diameter of which is such that it slidably receives the rod 23. Through this tube at its free end are extended securing elements 25 by means of which the adjustable engagement of the rod and tube may be effected.

The inner end of the arm 14 of the bracket 10 located at the same side of the vehicle with the steering post 26 is provided upon its under face with a downwardly extending lug 14$^a$, this lug and the arm having formed therethrough a vertical bore 15$^b$. The lug is engaged by the upper end of a tube or housing 27 which is held in position by means of attaching clips 28 engaging the housing and a suitable support, shown in the present instance as a vertical side bar of the windshield. Within the housing 27 is arranged a vertical shaft 29 the upper end of which extends through the bore 14$^b$ through a spacing washer 30 and has secured thereto an operating arm 31 the outer end of which is forked, as at 32, and embraces the section 24 of the connection between the operating arms 20.

Located upon the steering post 26 is a housing 33 through one wall of which is rotatably directed a shaft 34 having secured thereto exteriorly of the casing an operating handle 35. This operating handle coacts with a positioning spring 36 whereby it is held in adjusted positions, the spring having notches 37 for retaining the handle. In the opposite wall of the casing is secured one end of a flexible tubular housing 38 the opposite end of which is secured to the lower end of the tubular housing 27. This housing has arranged therein an operating member 39 for the shaft comprising a closely coiled spring one end of which is secured to the shaft 29 and the opposite end of which is secured to the shaft 34 of the control member. The casing 33 may be secured to the steering post by any suitable means as, for example, bands 40 surrounding the steering post. It will be obvious that by shifting the handle 35 the arm 31 may be caused to oscillate moving with it the arms 20 and signaling elements 18ª. It will furthermore be obvious that by reason of the construction above employed it is possible to adapt the device to either a closed or open car regardless of the width of these cars and at the same time support the signals so that they will be visible from both the front and rear of the vehicle to which they are attached. Many changes being possible in the construction of the device as hereinbefore set forth without materially departing from the spirit of my invention, I do not limit myself to such specific structure except as hereinafter claimed.

I claim:—

1. In a vehicle signal, an arm secured to each side of the vehicle and extending outwardly therefrom, an extension arm adjustably mounted on each arm, each of said extension arms being formed with a vertical pivot opening in its outer end, a shaft mounted in each of said openings, a signal secured to the upper end of each shaft, an operating arm secured to each shaft at the upper side of the extension arm and preventing downward movement of the shaft, means for preventing upward movement of the shaft, a connection between the arms whereby the arms move in unison, means for shifting said connection including a vertical shaft directed through one of said arms and having secured to the upper end thereof an outwardly extending arm engaging the connection with its forward end, a flexible connection between the opposite end of the shaft, and an operating handle for rotating the shaft.

2. In a vehicle signal, an arm secured to each side of the vehicle and extending outwardly therefrom, an extension arm adjustable longitudinally of each of said arms, each of said extension arms being formed with a vertical pivot opening in its outer end, a shaft mounted in each of said openings, a signal secured to the shaft for rotation therewith, an operating arm secured to each shaft at one side of the extension arm, a collar secured to the shaft at the opposite side of the extension arm, the arms of said shaft having their terminal portions directed toward one another, a steel rod connected to one of said arms, a tube connected to the other of said arms and into which said rod extends, means extending through the tube for adjustably engaging said rod to clamp the same in adjusted positions within the tube, and means for shifting one of said arms.

In testimony whereof I hereunto affix my signature.

CHESTER LUCAS.